No. 727,826. PATENTED MAY 12, 1903.
J. McCALLUM.
CAST METAL WHEEL.
APPLICATION FILED FEB. 13, 1902.
NO MODEL.

Witnesses
Percy L. Wooldridge
Deniza J. Matthews

Inventor
James McCallum

By
Jno. Imrie
Attorneys

THE NORRIS PETERS CO., PHOTO-LITHO., WASHINGTON, D. C.

No. 727,826.

Patented May 12, 1903.

UNITED STATES PATENT OFFICE.

JAMES McCALLUM, OF AURORA, ILLINOIS.

CAST-METAL WHEEL.

SPECIFICATION forming part of Letters Patent No. 727,826, dated May 12, 1903.

Application filed February 13, 1902. Serial No. 93,889. (No model.)

*To all whom it may concern:*

Be it known that I, JAMES McCALLUM, a citizen of the United States, residing at Aurora, in the county of Kane and State of Illinois, have invented certain new and useful Improvements in Cast-Metal Wheels; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements on cast-metal wheels of the type shown in Letters Patent No. 352,551, granted to me November 16, 1886.

The object of the invention is to provide in a wheel semihollow spokes alternately-disposed face to face to each other and radiating centrally from the hub.

Many other objects and advantages will be hereinafter referred to and be particularly pointed out in the claims.

Figure 1:
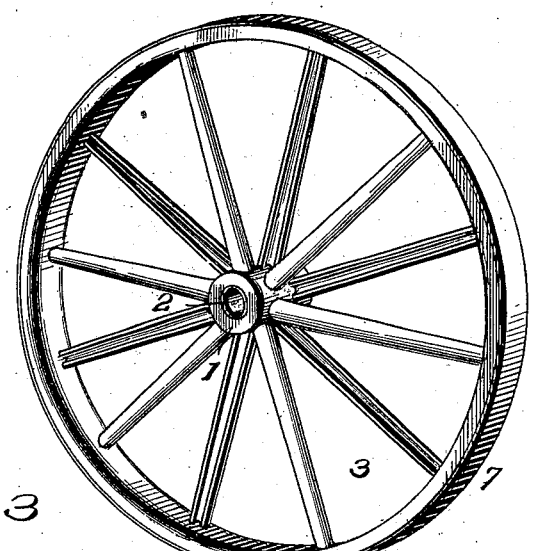
Figure 3:
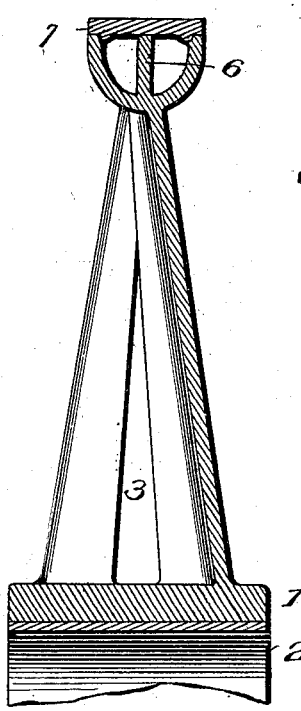
Figure 2:
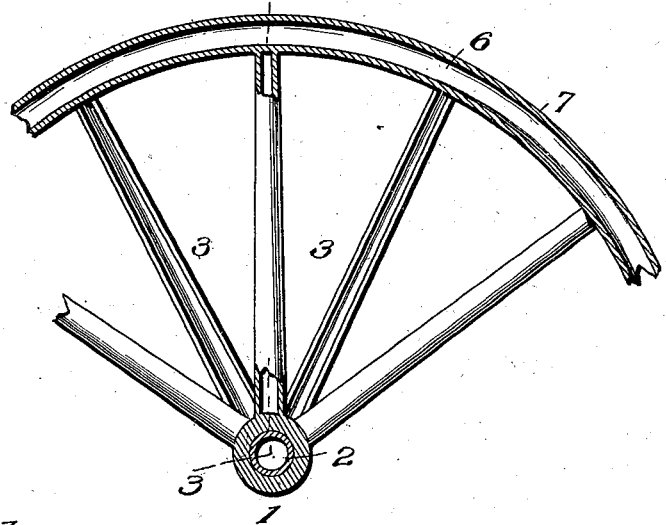

In the drawings forming a part of this specification, Figure 1 is a perspective view of a wheel embodying my invention. Fig. 2 is a detail side elevation of the same, showing parts in section. Fig. 3 is a transverse section on the line 3 3 Fig. 2.

The same numerals refer to like parts in all the figures.

The hub 1 is of cylindrical formation and is cast around a hard-steel or wrought-iron sleeve 2, which is securely fastened in position by the shrinkage of the cast metal. This construction affords ready means for substituting a new sleeve when the old one becomes worn. The spokes 3 are cast integral with the hub and are semihollow or V-shaped in cross-section, each spoke radiating centrally from the hub and joining the latter near the ends and joining the rim on a line with each other, said spokes being arranged in two series, preferably with their open sides facing each other, thereby imparting to the wheel the necessary strength and at the same time minimizing the weight and effecting an economy in the quantity of metal. The rim is preferably U-shaped in cross-section and has a central rib 6, cast with the spokes and hub. The rib thus constructed adds strength to the rim and in addition thereto forms a support and guide for the metallic tire 7, which has depending flanges adapted to be seated against the inside of the rim. The tire 7 is shrunk and is guided and positioned by the construction and arrangement of the rim.

My invention possesses many advantages over the present state of the art in that a considerable reduction in the weight of the wheel is effected without the loss of the necessary strength. The construction and disposition of the spokes relative to the hub and rim effectually brace and strengthen the parts, so that it matters not at what angle a strain should come the wheel will withstand it. Likewise the rim is braced to form a substantial structure.

I am aware of cast-metal wheels having tangentially-arranged spokes; but in many instances this arrangement has decided objections, which for specific purposes the straight spokes have superior advantages. Therefore I make no claim in this case to a tangent spoke; but What I do claim as my invention, and desire to secure by Letters Patent, is—

1. A cast-metal vehicle-wheel consisting of a hub, semihollow spokes cast with the hub and radiating on a line drawn through the center of the hub, the hollow portion of each spoke being alternately disposed in opposite directions from each other, and a rim cast with and connecting all of the outer ends of the spokes, substantially as described.

2. A cast-metal vehicle-wheel consisting of a hub, semihollow spokes cast with the hub, said spokes radiating on a line drawn through the center of the hub, and each adjacent spoke joining the hub at opposite ends thereof, the hollow portion of each spoke being alternately disposed in opposite directions from each other, and a rim cast with and connecting all of the outer ends of the spokes, substantially as described.

In testimony whereof I affix my signature in presence of two witnesses.

JAMES McCALLUM.

Witnesses:
M. I. GRAY,
P. JONES.